(12) United States Patent
Hoie

(10) Patent No.: US 8,925,489 B2
(45) Date of Patent: Jan. 6, 2015

(54) FISHFARMING PEN

(75) Inventor: Jorn Hoie, Maura (NO)

(73) Assignee: Maritime Oppdrett AS, Lorenskog (NO)

( * ) Notice: Subject to any disclaimer, the term of this patent is extended or adjusted under 35 U.S.C. 154(b) by 15 days.

(21) Appl. No.: 13/057,324

(22) PCT Filed: Aug. 6, 2009

(86) PCT No.: PCT/NO2009/000277
§ 371 (c)(1),
(2), (4) Date: Apr. 6, 2011

(87) PCT Pub. No.: WO2010/016769
PCT Pub. Date: Feb. 11, 2010

(65) Prior Publication Data
US 2011/0174232 A1  Jul. 21, 2011

(30) Foreign Application Priority Data
Aug. 8, 2008  (NO) .................................... 20083470

(51) Int. Cl.
*A01K 61/00*  (2006.01)

(52) U.S. Cl.
CPC ..................... *A01K 61/007* (2013.01)
USPC ............................ 119/223; 119/226; 119/233

(58) Field of Classification Search
USPC ......... 119/215, 223, 226, 228, 233, 211, 239; 441/256, 326, 244, 21, 23, 32; 4/507
See application file for complete search history.

(56) References Cited

U.S. PATENT DOCUMENTS

| 1,528,179 A | * | 3/1925 | Baldridge | 119/232 |
| 3,653,358 A | * | 4/1972 | Fremont | 119/223 |
| 3,698,359 A | * | 10/1972 | Fremont | 119/223 |
| 3,704,687 A | | 12/1972 | Nohmura | |
| 3,870,018 A | | 3/1975 | Fruchtnicht | |

(Continued)

FOREIGN PATENT DOCUMENTS

| GB | 2026823 A | 2/1980 |
| GB | 1594832 | 8/1981 |

(Continued)

OTHER PUBLICATIONS

"Coracle," Wikipedia, available at http://web.archive.org/web/20061230085343/http://en.wikipedia.org/wiki/Coracle. Dec. 30, 2006.*

(Continued)

*Primary Examiner* — Rob Swiatek
*Assistant Examiner* — Lisa Tsang
(74) *Attorney, Agent, or Firm* — Conley Rose, P.C.

(57) ABSTRACT

A fish cage for use in water comprising a main part (1) made of a watertight, substantially rigid material and has an outlet for effluent (12). The main part (1) is substantially hemispherical, and may slip unhindered through the water along a spherical path without influencing the body of water inside the cage substantially. Because the forces acting on the main part (1) from the surrounding water act mainly along the shell as opposed to perpendicular to the shell, the risk for tearing and the risk for swashing are reduced. Embodiments having flow and lighting conditions adaptable to different species are also disclosed. The cage can be localized in areas with currents and waves, and it can easily be adapted for different species.

11 Claims, 5 Drawing Sheets

(56) References Cited

U.S. PATENT DOCUMENTS

| | | | | |
|---|---|---|---|---|
| 3,883,913 | A | * | 5/1975 | Givens ............................ 441/37 |
| 3,886,902 | A | * | 6/1975 | Haynes ......................... 119/224 |
| 3,955,230 | A | * | 5/1976 | Rogers et al. .................. 441/131 |
| 4,023,514 | A | * | 5/1977 | Finsterwalder et al. ...... 114/256 |
| 4,036,176 | A | | 7/1977 | McCarty et al. |
| 4,170,954 | A | * | 10/1979 | Rinaldi ......................... 114/265 |
| 4,244,323 | A | * | 1/1981 | Morimura ..................... 119/223 |
| 4,312,296 | A | | 1/1982 | Stelleman et al. |
| 4,506,623 | A | * | 3/1985 | Roper et al. .................. 114/256 |
| 4,533,333 | A | * | 8/1985 | Andrew et al. ................. 441/38 |
| 4,543,902 | A | * | 10/1985 | Mihara ....................... 114/74 R |
| 4,669,420 | A | * | 6/1987 | Swanson ...................... 119/226 |
| 4,747,369 | A | * | 5/1988 | Gotmalm ...................... 119/223 |
| 4,798,168 | A | * | 1/1989 | Vadseth et al. ................ 119/223 |
| 5,450,818 | A | | 9/1995 | Caillouet |
| 5,570,480 | A | * | 11/1996 | Yeung ............................... 4/487 |
| 5,593,574 | A | * | 1/1997 | VanToever ................... 210/150 |
| 5,660,141 | A | | 8/1997 | Kjersem et al. |
| 5,713,303 | A | * | 2/1998 | Willinsky et al. ............. 119/218 |
| 5,921,830 | A | * | 7/1999 | Shoaff, III ...................... 441/37 |
| 6,318,292 | B1 | * | 11/2001 | Sakai ........................... 119/227 |
| 6,443,100 | B1 | * | 9/2002 | Brenton ........................ 119/259 |
| 7,690,330 | B2 | * | 4/2010 | Miller ........................... 119/228 |
| 8,006,645 | B2 | * | 8/2011 | Spartz .......................... 119/223 |
| 8,371,245 | B2 | * | 2/2013 | Papadoyianis et al. ........ 119/223 |
| 2005/0076842 | A1 | * | 4/2005 | Busse ......................... 119/57.7 |
| 2007/0268702 | A1 | | 11/2007 | McFadden |
| 2008/0035070 | A1 | * | 2/2008 | Harrison et al. .............. 119/223 |

FOREIGN PATENT DOCUMENTS

| | | |
|---|---|---|
| JP | 4322001 A | 11/1992 |
| NL | 1021868 C1 | 5/2004 |
| NO | 150741 B | 9/1984 |
| NO | 160753 B | 2/1989 |
| NO | 169751 B | 4/1992 |
| NO | 170662 B | 8/1992 |
| NO | 175341 B | 6/1994 |
| NO | 327035 B1 | 4/2009 |
| WO | 2006137741 A1 | 12/2006 |

OTHER PUBLICATIONS

PCT/NO2009/000277 International Search Report, Oct. 23, 2009 (5 p.).

Search Report for Norwegian Application No. 20083470, Mar. 2, 2009 (6 p.).

* cited by examiner

FISHFARMING PEN

CROSS-REFERENCE TO RELATED APPLICATIONS

This application is a 35 U.S.C. §371 national stage application of PCT/NO2009/000277 filed Aug. 6, 2009, which claims the benefit of Norwegian Application No. 20083470 filed Aug. 8, 2008, both of which are incorporated herein by reference in their entireties for all purposes.

STATEMENT REGARDING FEDERALLY SPONSORED RESEARCH OR DEVELOPMENT

Not applicable.

BACKGROUND

The invention concerns a fishfarming cage for use in water. An increasing part of the world's food production is expected to come from aquaculture or farming of aquatic organisms, as the requirement for food increases and the stocks available for fisheries or catching decreases. Aquaculture in artificial or natural basins and pools on shore is well known. A rice field with carps is an example on a biotope where one organism, i.e. rice, benefits from excrements from fish. Fishfarming cages (fish cages or cages) and fish farms have for many years also been localized in the sea, in lakes and in rivers to save on real estate costs and to benefit from a natural supply of fresh water.

Conventional fish cages can comprise a fish net suspended from floating elements. Such fish cages are easily torn by collisions with vessels or large objects floating in the currents. The load imposed on the net from the ambient environment, e.g. waves or powerful currents, can also cause tearing of the net.

Tear damages gives a substantial risk for escape. Risk for escape can also increase because some species, for instance cod, gnaw on the nets. Animals escaping from fish farms represent an economic loss and a genetic and ecological risk.

Other problems with conventional open fish net cages are that pollution, algae, infectious matter and parasites easily enters the farm from the surrounding water, and that the open farms themselves are a substantial source of pollution because excrements, unconsumed feed, unused medicaments and other effluents are led by the current to the environment around the farm. Roe and milt from an open farm can also cause genetic pollution. When many animals live in a small area in an open cage, the oxygen level may decrease in the surrounding water. This can increase the growth of algae, which in turn can create new problems for an unprotected open conventional fish farm.

The availability of suitable locations for conventional open farms with flowing, oxygen-rich water having limited wave height is limited from the outset. One problem is that the availability of such places is reduced because they are harmed or damaged by pollution from fish farms, or because the authorities do not permit localizing of fish farms in environments where the pollution may harm the environment.

Cleaning is also a problem with conventional cages. Under normal operation, cleaning of nets comprise a substantial part of the operational costs. Additionally, long quarantine periods are required after outbreak of disease in order to avoid carrying over the disease to new livestock in the cage. Hence, it may be advantageous if the cage can be adapted to different species, such that diseases and parasites depending on species, e.g. salmon, dies away while other species, e.g. halibut, scallops or clams, which are not hosts to salmon disease or parasites, are produced in the cage.

Streaming water is important to make a number of pelagic species form schools and thereby prevent aggressive behaviour which otherwise might limit the maximum number of fish in the cage. Bottom-dwelling species depending on feed in a passing flow, e.g. a tidal current, obviously also need flowing water to thrive. The availability of locations having natural flowing water is limited, and will likely further decrease with expected future environmental regulations. The need for robust closed fish cages with controlled internal flow conditions is expected to increase as the availability of convenient, protected places with suitable flow conditions is reduced. It will also be an advantage if the flow in such a cage can be reversed at regular intervals, because some species, e.g. salmon, becomes blind on one eye if they swim in the same direction continuously, and because some species living in tidal currents can benefit if the current alternates at regular intervals.

The lighting conditions in the fish cage can also be important, e.g. in fish farming. Early maturation of commercially important species as salmon and cod is a problem that can be reduced substantially by using light. When the fish produces roe or milt, the harvest weight is reduced and there is a risk that the fish must be fed for another 12-18 months before it regains a similar harvest weight.

U.S. Pat. No. 4,798,168 discloses an enclosure for farming fish, shell fish and other marine beings solving some of the problems above. A flexible bag of preferably watertight cloth is used instead of an open net, and prevents pollution, algae, parasites and infectious matter from entering the enclosure. An outlet for unconsumed feed, excrements and other pollution prevents or reduces discharge of effluent to the surrounding waters. Desired flow is ensured by water inlets-expelling water in or near the surface perpendicular to the cage's radius to cause rotation of the water within the cage. Air and/or oxygen is added to the water before it is supplied to the cage. The lighting conditions can be controlled by providing a roof or cover made from a light impervious cloth over the bag, and by making the flexible cloth comprising the bag translucent. The costs of cleaning the farm can be reduced by threading a fresh bag outside the old one, and then remove the used bag. The main problems of this farm is that the flexible bag is subject to tear damage, that the water inlet provides too high water velocities close to the perimeter and/or too low water velocities closer to the centre, and that the cage is suitable for certain types of fish only. Another problem with the bag is that the water level within the bag must be kept higher that the water level outside it in order to maintain a substantial circular form when seen from above.

NO 169 751 B, NO 160 753, GB 1 594 832, NO 150 741, U.S. Pat. No. 3,870,018 and NO 175 341 show examples on fish farming basins and cages having rigid walls and an outlet for excrements and other effluent in the bottom. All of them have a substantially cylindrical upper part, a conical lower part, and rotating water within as illustrated by FIG. 1b. The purpose of the conical part is to increase the tangential speed of the water near the bottom, and thus improve the drainage. A problem with this shape is that the straight walls give resistance in the water to currents and waves, and thereby pushes on the water within the cage. Hence, wave movements are easily transmitted to the water within the cage, and will increase the risk for swashing (uncontrolled exchange of water) from inside or outside the cage. This increases the risk for escape and biological contamination. Hence, such fish farming vessels are unsuitable for use in places with waves that can cause such swashing. An objective of the present invention is therefore to provide a floating fish cage which is not torn apart in waters with waves and currents, and which at the same time easily can be adapted to different species' requirements for flow conditions, lighting conditions, water quality etc.

SUMMARY

According to the invention, this is achieved by providing a fish cage for use in water comprising a main part made of a watertight, substantially rigid material and having an outlet for effluent, wherein the main part is substantially hemispherical.

A hemispherical cage having rigid walls will follow the motion of the waves in the surrounding water, and be able to slip through the water along a spherical path with minimal disturbance to the water body within the cage. When the forces working from the water outside and inside the main part of the cage substantially are shear forces acting along the shell rather than perpendicular to the shell, the resistance to tearing and swashing is increased.

When wave motion is not transferred into the cage, the internal flow pattern with 30 rotation in horizontal planes change minimally even in embodiments comprising nozzles expelling water tangentially from a wall moving in this manner relative to the body of water within the cage. The reason is that the nozzles in average will expel equal amounts of water above a given horizontal plane and below the horizontal plane, and thus provide a mean tangential component in the horizontal plane.

Polluted water from the cage can be cleaned and controlled before discharge, and the cage can hence be placed in locations where it otherwise would be impossible or prohibited. Shelves may be disposed in the cage for stiffening or for bottom-dwelling organisms. The cage can contain several species, for example such that shell fish, plants, sea weed or kelp can utilize fish excrements. The cage can be used in saltwater or freshwater for environmentally sound farming of fish, mussels, shellfish, crustaceans, sea urchins, plants, algae, fungi or other organisms living in water. It can also be used for treatment of ill or injured animals.

BRIEF DESCRIPTION OF THE DRAWINGS

These and other benefits of the invention are apparent from the enclosed claims, 15 and are described in greater detail in the following with reference to the accompanying drawings, where like reference numbers refer to like parts, and where:

DETAILED DESCRIPTION OF A PREFERRED EMBODIMENT

Figure 1A:
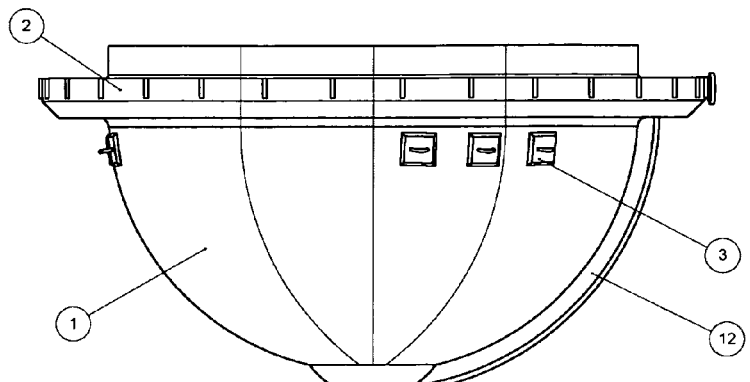
FIG. 1a shows a first embodiment of a cage viewed from the side.

FIG. 1a shows a first embodiment of the fish cage seen from the side. The main part 1 is manufactured from a watertight, substantially rigid material, e.g. aluminium or some other metal, fibre-reinforced epoxy or plastic. The main part 1 can comprise one, substantially compact, layer or a sandwich structure as described in greater detail below. The shape of the main part in FIG. 1a is approximately hemispherical. Seen from above, the substantially circular cross section makes the shape as neutral as possible with regards to forces imposed from different directions, for example from currents of water or wind. Viewed from the side, a semi circle has less cross sectional area than a rectangle with the same width and height as the semi circle. Hence, a hemisphere submerged in flowing water is less influenced by the flow than a corresponding cylinder. A cone has similarly a smaller vertical cross sectional area than a hemisphere, but at the same time less volume. A hemisphere is thus a compromise between the desires for a large volume and a small sensitivity to underwater currents.

A hemispherical fish cage with rigid walls is able follow wave motions in the surrounding water and slip through the water along a spherical path about any horizontal axis through the equator of the sphere without imposing substantial forces on the water body within the cage. When the forces imposed from the water on the main part of the cage are mainly shear forces, i.e. forces working along the shell as opposed to perpendicular to the shell, the risk of tearing and the risk of swashing are reduced.

The main part 1 is connected to a floating collar 2. This is important to stabilize the main part 1 to prevent it from turning over. A hemispherical shell without such a floating collar 2 or similar floaters will easily turn over. The floating collar 2 can also shore up the cage so that it maintains a substantially circular horizontal cross section, and it can also be used as a walkway around the cage.

Mooring posts 3 are shown fixed to the main part 1 in order to illustrate that the main part 1 does not necessarily move as much as the floating collar 2. It can be advantageous that the walkway on the floating collar 2 follows the wave motion on the surface to a certain extent, while the main part 1 moves to a lesser extent. In the embodiment shown in FIG. 1a, a combined walkway and floating collar 2 can, for example, comprise sections flexibly attached to each other and to the main part 1. Under such circumstances it may be preferential to attach the anchors to the main part 1.

However, it should be understood that the mooring posts can be attached to the floating collar 2, which also may be fixed to the main part 1.

The mooring posts 3 will normally be connected through anchoring lines to anchors. The anchoring lines will typically comprise springs and damping elements connected through chains, ropes or the like to anchors. The mooring is not a part of the invention, and hence not shown in FIG. 1a.

FIG. 1a further illustrates that the main part 1 can comprise sections which may be replaced without replacing the entire main part 1 after damage, and which may ease the production of the cage. However, it is understood that the cage can be manufactured in one piece, alternatively by sections that are attached permanently to each other by welding, gluing and/or bolting.

Figure 1B:
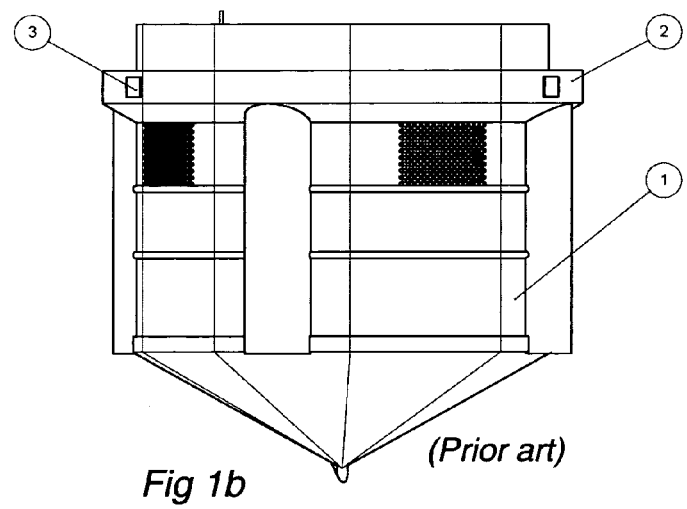
FIG. 1b shows a known embodiment of a cage with rigid walls viewed from the side.
Figure 1C:
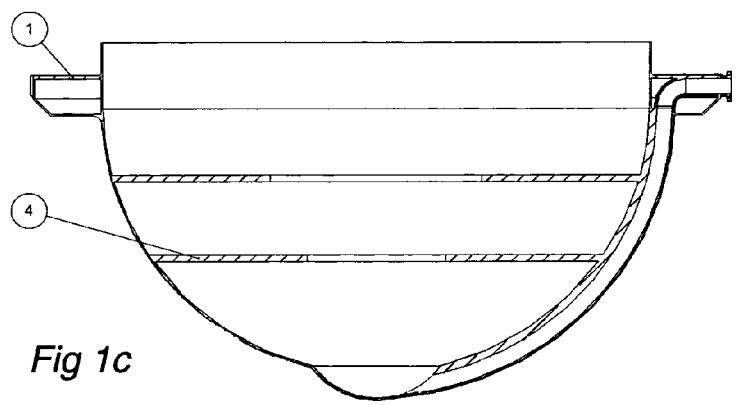
FIG. 1c is a cross sectional view of a cage comprising shelves.
Figure 1D:
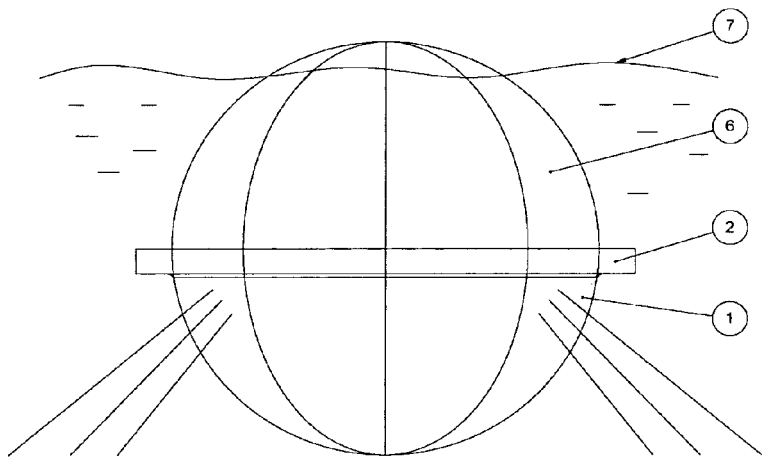
FIG. 1d shows a partly submerged cage further comprising a cover.

In one embodiment the walls in the main part 1, and if desired also the cover in FIG. 1d, manufactured as a sandwich structure comprising a substantially gas-filled, for example air filled or foam filled, layer between an inner and an outer shell. If the structure is thicker near the upper part of the main part 1, the sandwich design may reduce or eliminate the need for a floating collar 2. Distance and medium/foam type between the inner and outer shells determine the lift and thermal conductivity of the structure. Thus, the sandwich design can determine how high the cage will float in the water, and the water within the cage can have an ideal temperature that ensures fast, even and controlled growth relatively independent of the temperature in the surrounding water.

FIG. 1b shows a known embodiment of a cage having rigid walls, viewed from the side. In this embodiment, the main part 1 is cylindrical in an upper portion and substantially conical in a lower portion. This shape increases the speed of the effluent, and hence ensures an efficient drainage. Swashing (uncontrolled exchange of water) and internal flow conditions can be problematic with this embodiment.

FIG. 1c is a cross section through a cage having shelves 4. The shelves can act purely as stiffening ribs (shores), and/or shelves for bottom-dwelling organisms.

A fish cage or fish farm at sea can be exposed to forces from wind and waves. The wind direction and wave direction varies with time, and significant wave heights over 2 m and wavelengths over 12-14 m can be typical values for such an environment. Such amplitudes and wavelengths can be large relative to a typical marine cage having a radius of 10-meters or less. Resonance phenomena, where the cage picks up frequencies near its resonance frequency can amplify the problems. Both waves and wind are phenomena appearing near the surface, and the influence of both can be reduces or removed by submerging the cage partly or completely.

Hence, the embodiment shown on FIG. 1d comprises a fully or partly closed superstructure which permits submersion. The superstructure can be open at the top for partial submersion. If desired, the superstructure can also be a closed cover as shown in FIG. 1d, wherein the cage with cover comprises an approximate sphere. This can, if desired, be completely filled with water, and be moored at a depth where it is not influenced by waves and wind. The superstructure or cover can be of a material and design similar to, or different from, the material and design of the main part, for example a sandwich structure made of fibre-reinforced epoxy.

Figure 2A:
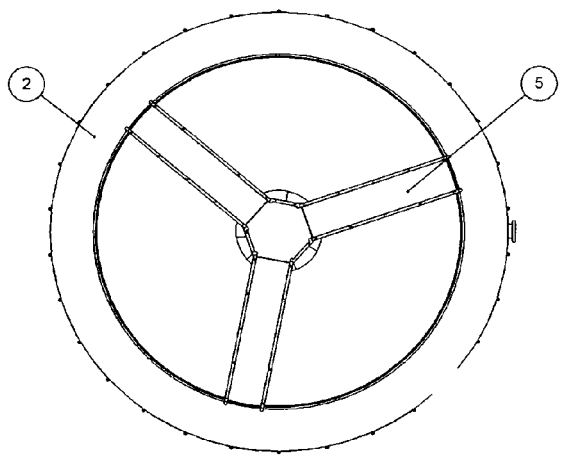
FIG. 2a shows a first embodiment of a cage viewed from above.

FIG. 2a shows a first embodiment of the cage viewed from above. This embodiment has 3 supportive elements or spokes, and is suitable for smaller cages.

The spokes can function as supports and/or walkways. One or more of them can at the same time be used to distribute feed in the cage. When feed is distributed in this manner, it is easy to avoid crushing damage on the pellets, which otherwise easily occurs when pressurized air is used to sling the feed outwards in large cages or fish farming ponds. This can be economically significant in raising some species, e.g. salmon, which will only feed on feed (pellets) with a certain size, and where crushed pellets hence are wasted. The feed supply can be controlled by monitoring the amount of unconsumed feed passing through the cage. Use of sensors to monitor the state of the cage, for instance the amount of feed in the water, is described in greater detail below.

The spokes may provide support for a covering, for instance in the form of a conical tarpaulin fastened along the edge of the main part 1, and kept up by a pole on a spoke at the centre of the cage. Another embodiment can be a Chinese fan attached to the spokes. In embodiments where it is advantageous to control the lighting conditions in the cage, this covering may be a opaque cloth or Chinese fan suspended from the spokes. The covering or "roof" can be low to make the wind catch as small as possible. At the same time it is preferred that the covering has a slope and design sufficient to ensure run-off and withstand a potential snow load.

Figure 3A:
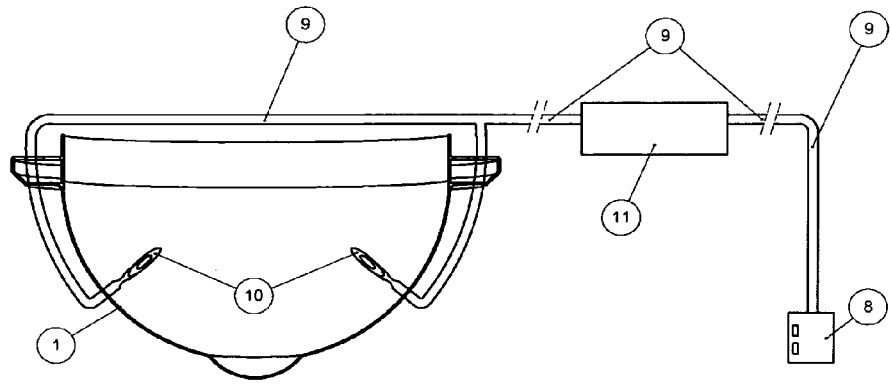
FIG. 3a is a schematic view of the water supply.
Figure 3B:
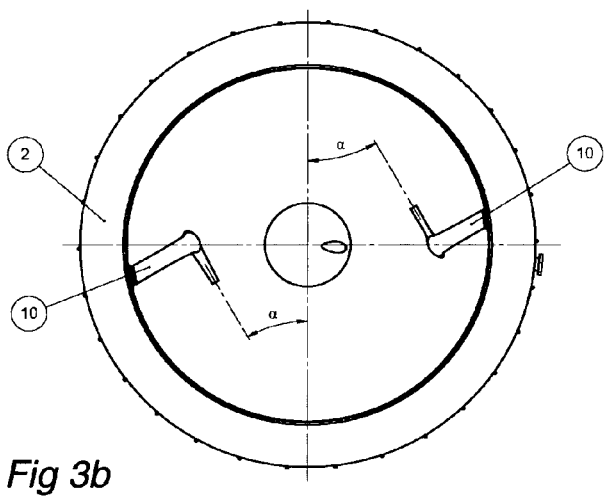
FIG. 3b shows the water inlet to a cage viewed from above.
Figure 3C:
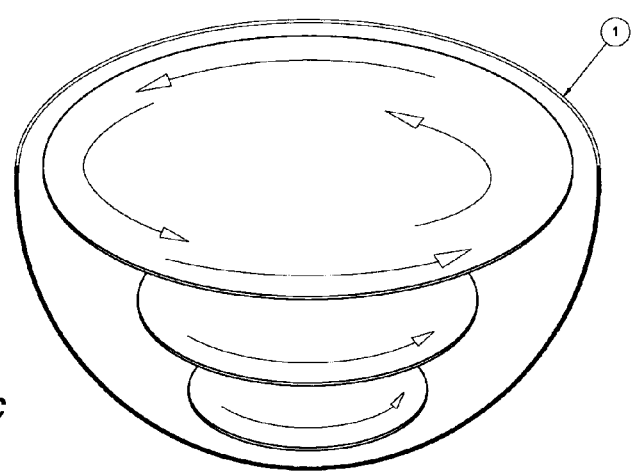
FIG. 3c illustrates the flow pattern within a cage.
Figure 3D:
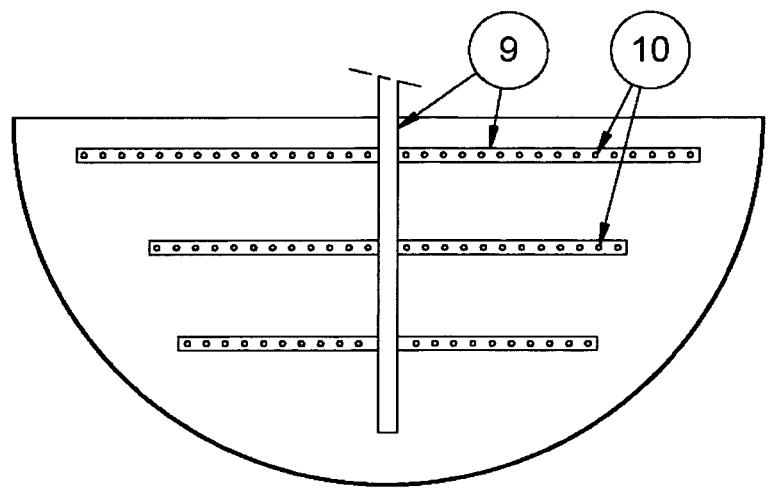
FIG. 3d shows a device to provide flow in a cage.
Figure 5:
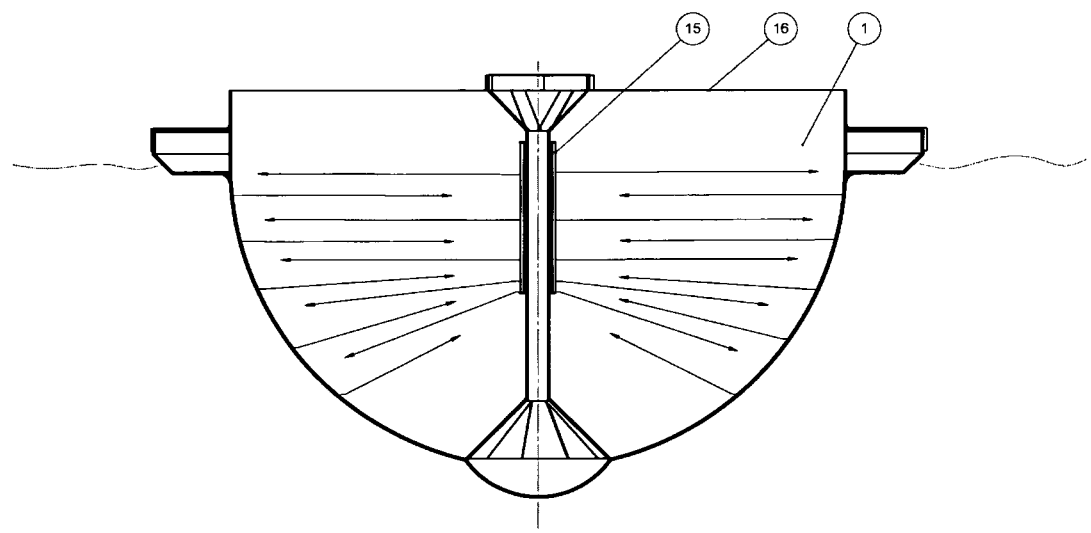
FIG. 5 shows an arrangement for controlling the light in a cage.

The spokes can also be used for supporting other equipment, for instance water supply for the device shown in FIG. 3d or the lighting armature shown in FIG. 5.

Figure 2B:
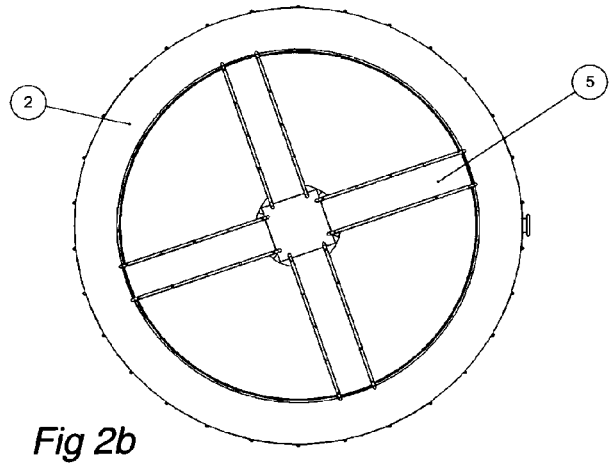
FIG. 2b shows a second embodiment of a cage viewed from above.

FIG. 2b shows another embodiment of the cage viewed from above. This embodiment has 4 spokes having similar functions to the ones depicted in FIG. 2a. It should be understood that other embodiments may have fewer than 3 or more than 4 spokes.

Independent of the design of the cage, it may be advantageous to dispose cameras and other detectors on the internal walls and/or bottom of the main part. These cameras and detectors are used to monitor and control important parameters in the cage, for instance the amount of supplied feed depending on the amount of feed passing unconsumed through a school of fish, the rate of supplied water depending on the flow in the cage, and oxygen and/or the frequency and intensity of supplied light depending on water quality, amount of fish, amount of plankton and other conditions in the cage. Several of these conditions change over time as the amount and type of biomass in the cage changes. It should be understood that it is practical to use different kinds of detectors to control feed supply, oxygen content, visibility, flow and other conditions in the cage. It should also be understood that different cages may be equipped with different detectors and that embodiments without cameras or other detectors are within the scope of the invention.

FIG. 3a is a schematic view of the water supply, where water is sucked in through an intake 8, passes through a hose or pipe 9 via a treatment and control facility 11, and is expelled to the cage through nozzles 10. The intake 8 is provided with sensors to measure important parameters used to steer the intake to a location and depth having as suitable water quality as possible.

Water temperature, pollution, concentration of oxygen, pH, salinity (concentration of NaCl), and hardness (concentration of CaO) can be more or less important for the growth and well-being of the organisms in a cage, whether the cage contains fish or other organisms. These and other parameters for water quality must be adapted to the species within the cage.

As discussed, it is an advantage that the cage has internal flow conditions ensuring the well-being of the organisms in it. This can imply that the water should flow at approximately equal speeds at the perimeter of the cage and near the centre, i.e. with equal tangential velocity as opposed to equal angular velocity. In some instances it may be desirable to alter the direction of flow at regular intervals. This can reduce the stress level and increase the well-being of the fish in the cage. It is another advantage that the cage thereby can contain more fish without adversely affecting the well-being.

Flow in the cage can be provided by expelling water through reversible nozzles 10, for example as shown in the FIGS. 3a and 3b or in 3e and 3f.

Wave motion will, as discussed above, not enter the cage, because the hemispherical shape slips unhindered along a spherical path without pushing on the water inside. The inner flow pattern with rotation in horizontal planes will not change even in embodiments having nozzles expelling water tangentially from a wall that moves in this manner with respect to the water body within the cage. The reason is that the nozzles on the average will expel equal amounts of water over a given horizontal plane as below the horizontal plane, and thus give a mean tangential contribution in the horizontal plane.

FIG. 3a shows an embodiment of nozzles 10 viewed from the side, and FIG. 3b shows the same nozzles viewed from above. The nozzles 10 in FIGS. 3a and 3b are reversible and of a known type. They function in that water is expelled at a velocity proportional to the square root of the pressure fall over them (Bernoulli's law). The water around them is gradually pulled along, until the entire water body within the cage rotates about the central rotation axis of the cage.

A problem with prior art farms is that the inlet water is expelled tangentially. The water body will then after a while rotate with constant angular velocity. This means that the water velocity near the centre becomes lower than the velocity at the periphery. Fish swimming near the centre will in this case have no effect of the flow, and hence be prone to eye-biting. Alternatively, the angular velocity may be increased. Then, the water velocity at the periphery becomes too large, such that the fish swimming in the outermost region get stressed.

If water is expelled through nozzles 10 near the surface or along the circumference, it takes longer time before all the water in the cage is pulled along than if water is expelled down in the cage and a distance from the periphery., for instance as the localization of the nozzles 10 is shown in FIGS. 3a and 3b.

The problem with constant angular velocity can be solved as shown in FIG. 3b, where one or more nozzles 10 supply water with a velocity component directed toward the centre. Thus, in this case the nozzles in FIGS. 3a and 3b push the water near the centre of the circle faster than they push the water near the circumference.

A problem with nozzles 10 as shown in FIGS. 3a and 3b is that the angle inwards 5 from the tangential direction depends on the radial position of the nozzles and of imposed pressure.

Another problem with nozzles 10 as shown in FIGS. 3a and 3b can occur if the two nozzles are localized asymmetric or at different heights. Then the velocity or lo the nozzle opening must be adjusted to avoid eccentric rotation.

A further problem is that few nozzles (here: 2) provide few points of attack on the water body. Hence, a relatively long time may be required to reach equilibrium, i.e. when the water farthest off from the nozzles 10 is pulled along by the water flowing from the nozzles.

FIG. 3c illustrates the flow in three horizontal planes in a hemispherical shape. By supplying water with equal speed along the radius of each of the three planes, a more advantageous flow is achieved. If the water is expelled through several nozzles 10 along the radius, a shorter time is required before the water between the nozzle openings is pulled along than the time required to pull along water several meters from a nozzle 10. If nozzles are provided in several planes, as shown in FIG. 3c, a shorter time is required before the water between the planes is pulled along than the time required to pull along water several meters over or under a nozzle 10 as shown in FIG. 3a.

FIG. 3d shows a device wherein water is supplied from above through a pipe 9 at the rotation axis. Horizontal arms at several heights supply water through openings or nozzles 10. This means the desired flow, i.e. small variations of tangential velocity along concentric circles along the radius as shown in FIG. 3c as opposed to fixed angular velocity, is easier to achieve than by using a few nozzles as shown in FIGS. 3a and 3b. It should be understood that the water can be supplied through slots extending axially along the horizontal arms rather than through discrete openings or holes 10 as shown in FIG. 3d. The horizontal arms can be retained on the inner wall of the main part to avoid a large torque on the vertical pipe. Even if the device shown in FIG. 3d is adapted to an hemispherical cage, it should be understood that the device easily may be adapted to cages having other vertical cross sections, for instance a cylindrical cage or a cage having a shape as shown in FIG. 1b.

Several points of attack in several planes reduce the mean distance from an opening or slot 10 to an arbitrary point in the cage. This reduces the time it takes to obtain equilibrium when the flow is reversed such that the water flows in the opposite direction.

Figure 3E:
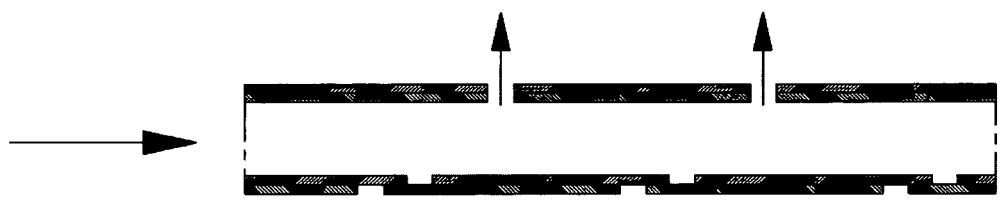
FIG. 3e-f are cross sectional views of an inlet tube to change the direction of flow.

FIG. 3e shows a detail from one of the horizontal arms in FIG. 3d viewed from above. The arm comprises two concentric pipes which can be displaced axially relative to each other. In the position shown in FIG. 3e, the water is expelled in a direction which may correspond to the direction into the paper plane on FIG. 3d.

Figure 3F:
Figure 4:
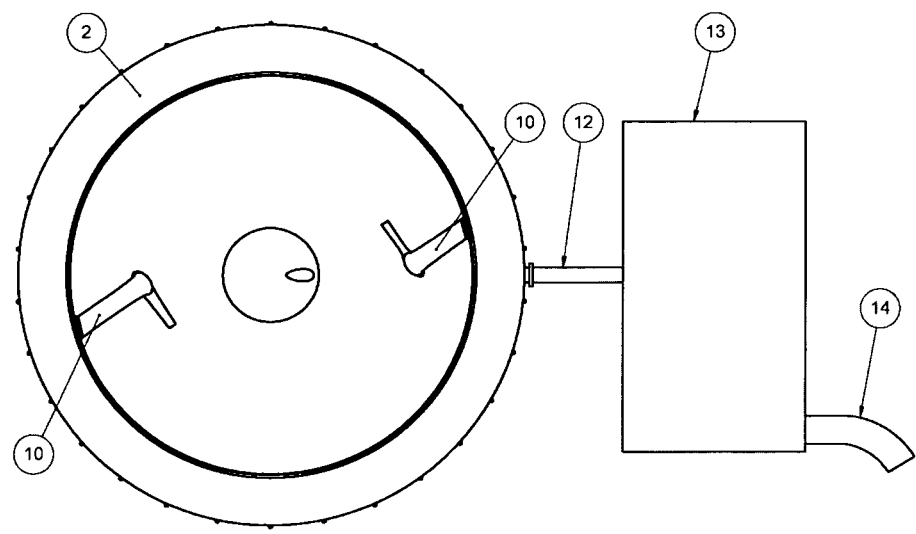
FIG. 4 is a schematic view of a treatment plant for the effluents from a cage.

FIG. 3f shows the arms in FIG. 3e in their other position. The water is then expelled in a direction which may correspond to the direction out of the paper plane on FIG. 3d.

If the horizontal arms shown in FIG. 3d comprise longitudinal slots, the arms can comprise similar concentric pipes wherein one pipe comprises a slot that can be rotated 180° about its (horizontal) rotation axis in order to change the direction of the outlet.

Regardless of the shape of the cage, some form of drain in the bottom to collect and remove excrements and unconsumed feed. This drain will act as a sink, and there may arise a whirlpool effect when a circular flow pattern is established in the cage. This sink effect can be reduced in a period where the rotation of the water is substantially stopped and before flow in the opposite direction has been established. Sensors localized on the inner wall of the cage can be used to monitor the flow in the cage, and makes it possible to control drainage of effluents when the flow pattern is favourable. This can also occur when the rotation in one direction has reached equilibrium and is stable.

The lighting conditions can be important to achieve fast, even and controlled growth, and they may influence the well-being and health of the fish. Hence, it may be desirable to block out all natural light and control parameters like the intensity, wavelength, duration, localization etc of the light. The localization of the light source can also contribute in controlling the swimming pattern of the fish.

FIG. 5 shows an arrangement for control of light. The natural light is blocked out by a main part 1 made from a substantially solid and opaque material and by covering the cage above with an opaque material 16. A light armature 15 is disposed centrally in the cage. In the embodiment on FIG. 5, the inner surface of shell 1 and possibly the covering 16 reflecting light. This can be accomplished by coating with a reflecting material, or by manufacturing the cage from a light-reflecting material, e.g. aluminium. Hence, the cage becomes evenly illuminated by a light in which the fish thrive, and there are no shadowy areas that can cause maturation too early.

By blocking out the natural light, in particular bright sunlight, it may also become easier to control the temperature conditions within the cage, especially in small cages with a limited circulation of water.

The invention claimed is:
1. A fish cage for use in water, the fish cage comprising:
   a main part comprising a watertight, substantially rigid hemispherical shell having an outlet for effluent, wherein a rigidity of the shell is substantially constant, wherein the shell includes a substantially circular open- ing that defines a plane, and wherein the shell rotates in the water about an axis lying in the plane; and at least one nozzle that provides a rotational flow of water around central axis extending perpendicularly through the plane, wherein the flow has approximately equal tangential velocity from the circumference of the main part to a region near the central axis.

2. The fish cage according to claim 1, wherein the main part is suspended from a floating collar.

3. The fish cage according to claim 1, wherein the main part is a sandwich structure comprising a substantially gas filled layer between an inner shell and an outer shell.

4. The fish cage according to claim 1, wherein at least one substantially horizontal shelf extends from a circumference of the substantially circular opening inwards toward a central axis extending perpendicularly through the plane.

5. The fish cage according to claim 1, wherein the main part further comprises a watertight cover for submersing the fish cage in water.

6. The fish cage according to claim 1, further comprising at least one supportive element that extends from a circumference of the substantially circular opening inwards toward a central axis extending perpendicularly through the plane.

7. The fish cage according to claim 1, wherein the at least one nozzle is configured to change orientation to reverse the flow from one rotational direction to an opposite rotational direction.

8. The fish cage according to claim 1, wherein the main part is covered by an opaque cover, and at least one light source is disposed within the main part.

9. The fish cage according to claim 1, wherein the at least one nozzle is disposed on an elongated body extending from a circumference of the substantially circular opening toward the central axis.

10. The fish cage according to claim 9, wherein the elongated body comprises an inner pipe disposed in and, in slidable, concentric, and liquid-tight engagement with an outer pipe, the outer pipe comprising at least one first opening for outflow of water in a first direction, and at least one second opening for outflow of water in a second direction, the inner pipe comprising at least one opening that can be aligned with either the first opening or the second opening, whereby a relative movement of the inner pipe within the outer pipe causes the water to flow out from the elongated body in the first or the second direction.

11. The fish cage according to claim 7, wherein the at least one nozzle is disposed on an elongated body extending from a circumference of the substantially circular opening toward the central axis.

* * * * *